No. 790,774. PATENTED MAY 23, 1905.
M. E. ZELLER.
BIT.
APPLICATION FILED OCT. 21, 1903.
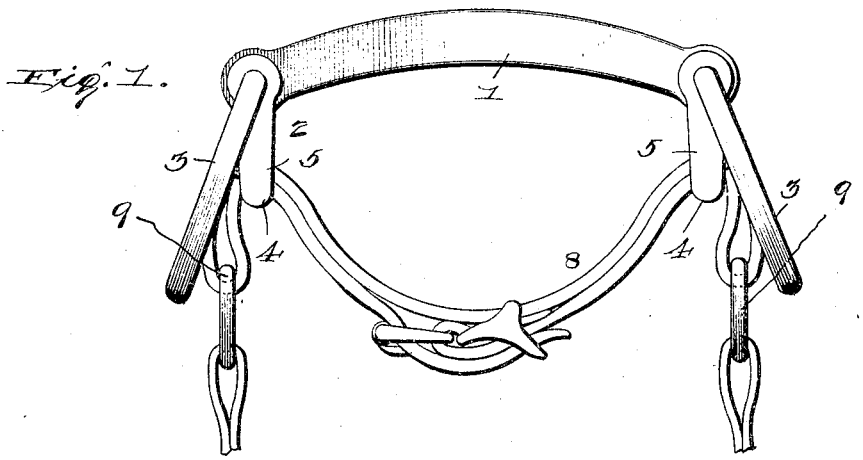
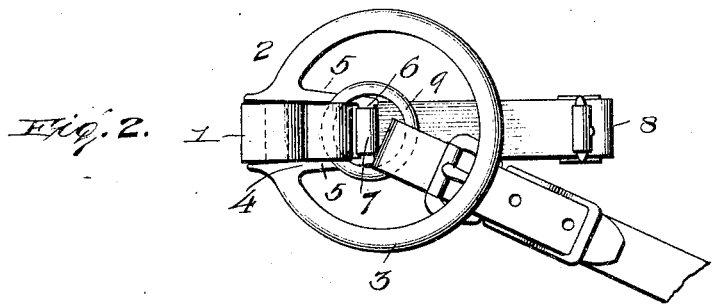
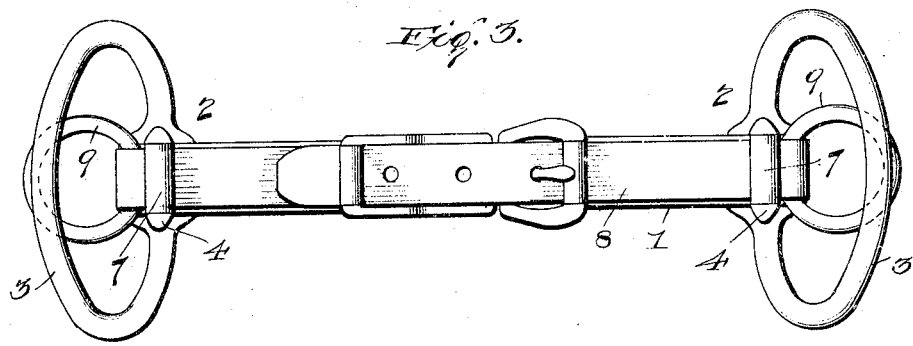
WITNESSES:
INVENTOR
M. E. ZELLER.
BY Edson Bros,
Attorneys No. 790,774. Patented May 23, 1905.

UNITED STATES PATENT OFFICE.

MELANCTHON E. ZELLER, OF GILBOA, OHIO.

BIT.

SPECIFICATION forming part of Letters Patent No. 790,774, dated May 23, 1905.

Application filed October 21, 1903. Serial No. 177,955.

*To all whom it may concern:*

Be it known that I, MELANCTHON E. ZELLER, a citizen of the United States, residing at Gilboa, in the county of Putnam and State of Ohio, have invented certain new and useful Improvements in Bits; and I do hereby declare the following to be a full, clear, and exact description of the invention, such as will enable others skilled in the art to which it appertains to make and use the same.

This invention relates to certain new and useful improvements in bridle-bits, and has for its object to provide a bit which will be simple and cheap of manufacture, will not hurt the horse's mouth, and by which the animal may be easily managed.

The invention consists in the construction and combination of parts hereinafter described, and more particularly pointed out in the claims.

In the accompanying drawings, illustrating the preferred embodiment of my invention, Figure 1 is a plan view of my improved bit. Fig. 2 is a side view of the same. Fig. 3 is a rear view thereof.

Referring more particularly to the drawings, 1 is the mouthpiece or bit-bar, made of any suitable material, such as leather or metal, at each end of which is secured a cheek-piece 2, comprising a ring 3 and a loop-piece 4, the latter normally standing at an angle to the plane of the ring, said loop standing inwardly from the ring. The loop consists of two substantially parallel side pieces or bars 5, connected at their ends by a cross-bar 6, which is preferably provided with a roller-bearing 7. An adjustable chin-strap 8, preferably of double thickness or looped upon itself, has one of each of its looped extremities confined in each of the loop-pieces by means of a small ring 9, placed in said looped ends of said strap. The reins are connected to these two small rings and pass within the cheek-rings in the angles between said cheek-rings and the loop-pieces. By this arrangement it will be seen that in ordinary driving by exerting slight draft on the reins the animal may be easily guided, while strong pulling thereon will tighten the chin-strap around the horse's jaw without cutting or otherwise hurting his mouth, and yet be severe enough to insure the control of the most spirited animal. Also by means of the arrangement of the inwardly-extending loop-piece the chin-strap is brought close to the mouthpiece of the bit, so that a direct purchase on the jaw is obtained. By use of the roller-bearing on the end bar of the loop-piece the movement of the chin-strap is rendered more easy and efficient. The strap is made adjustable to fit any sized jaw.

It is evident that persons skilled in this art may make changes in the construction herein shown as the preferred embodiment of my invention without departing from the principle or sacrificing the advantages thereon. I therefore do not limit myself to the details of construction shown and described herein, as they may be changed at will and the spirit of my invention remain intact and be protected.

Having thus described my invention, what I claim as new, and desire to secure by Letters Patent, is—

1. In a device of the character described, a mouthpiece having secured thereto an integral cheek-piece comprising a ring and a loop-piece arranged at an angle to each other, and in different vertical planes.

2. In a device of the character described, a mouthpiece having secured thereto an integral cheek-piece comprising a ring and a loop-piece arranged at an angle to each other, and in different vertical planes, and a chin-strap engaging said loop-piece.

3. In a device of the character described, a mouthpiece having secured thereto an integral cheek-piece comprising a ring and a loop-piece arranged at an angle to each other and in different vertical planes, said loop-piece formed of substantially parallel side bars connected by a bar having a roller-bearing.

4. In a device of the character described, a mouthpiece having secured thereto a cheek-piece comprising a ring and a loop-piece arranged at an angle to each other, said ring integral with said loop-piece and extending above and below from said loop-piece.

5. In a device of the character described, a mouthpiece having secured thereto cheek-pieces each comprising a ring and a loop-piece arranged at an angle to each other, said loop-piece standing inwardly of said ring and formed of substantially parallel side bars, and a cross-bar having a roller-bearing, and an adjustable chin-strap having a loop at each end carrying a ring for connection with the reins and by means of which said strap is confined to said loop.

6. In a device of the character described, a mouthpiece provided with a cheek-piece comprising a ring and a loop-piece radiating from a common hub but arranged in different vertical planes, said loop-piece standing inwardly from said ring, a chin-strap adapted to pass through said loop-piece and extend rearward within the angle formed between said ring and loop-piece.

In testimony whereof I affix my signature in presence of two witnesses.

MELANCTHON E. ZELLER.

Witnesses:
CAREY WINEMAN,
W. H. FISHER.